United States Patent Office 3,565,603
Patented Feb. 23, 1971

3,565,603
PROCESS FOR PRODUCING OPTIMUM YIELDS OF FERROALLOYS IN ELECTRIC REDUCTION FURNACES
Helmut Klee, Knapsack, near Cologne, Dieter Schorning, Bruhl-Pingsdorf, and Hermann Niermann, Bruhl, Germany, assignors to Knapsack Aktiengesellschaft, Knapsack, near Cologne, Germany, a corporation of Germany
No Drawing. Filed May 31, 1968, Ser. No. 733,309
Claims priority, application Germany, June 15, 1967, K 62,562
Int. Cl. C21b 3/04; C21c 5/52; H05b 7/18
U.S. Cl. 75—11    4 Claims

ABSTRACT OF THE DISCLOSURE

As the reduction of oxidic iron ores progresses in an electric arc furnace of substantially constant furnace space, the current intensity needed to maintain the reaction varies. It has been found that within defined limits there is an inverse relationship between the optimum intervals at which the furnace is to be tapped and the current intensity.

---

Process for producing optimum yields of ferroalloys from slag-forming oxidic ores in electric reduction furnaces with variation of the power load therein, comprising modifying (a) the ferroalloy tap-intervals, which are expressed in megawatt power supplied per hour to the furnace and are determined by the $Fe_2O_3$ content of the reactants, the ferroalloy-receiving furnace space, and the secondary current intensity, and modifying (b) the secondary current intensity, (a) and (b) being modified in inverse relationship with respect to each other in such a manner that the tap intervals are shortened, given a current intensity increase, and prolonged, given a current intensity reduction.

The present invention provides a process which enables ferroalloys including, for example, ferrochrome, ferromanganese, ferrotungsten and more particularly ferrophosphorus, to be obtained in optimum yields from slag-forming oxidic ores in electric furnaces, given variation of the power load therein.

In electric ore-reduction furnaces, wherein the ore reduction is accompanied by the formation of slag having a specific weight lighter than that of the resulting metal, the tapped slag is often found to contain a relatively large proportion of metal.

This is a very undesirable phenomenon in those cases in which the slag is obtained in a quantity the same as, or substantially larger than that of recovered metal.

For example, the reduction of phosphate ore containing substantially 33% by weight $P_2O_5$ and substantially 1.3% by weight $Fe_2O_3$, in an electric phosphorus-production furnace, is found to entail, per 100 tons phosphorus, the formation of about 700 tons slag consisting substantially of calcium metasilicate; the iron oxide contained in the ore, which undergoes reduction in a secondary reaction, results in the formation of about a further 8 tons of ferrophosphorus containing between 20 and 26% by weight phosphorus. The ferrophosphorus which gradually accumulates on the bottom of the furnace is tapped after a certain period of time.

The power consumption rate in megawatt hours (mw. hr.) and/or the space receiving the ferroalloy, the space volume being determined by the inner base area of the electric furnace and the position of the tap-hole, have been the factors which heretofore have affected the ferroalloy tap-intervals, given a constant $Fe_2O_3$ content in the reactants.

Applied to the electrothermal production of phosphorus from crude phosphate, quartz and coke inside a symmetrical electric reduction furnace, which has a capacity of 25 megawatt and is operated with a secondary current intensity of 45,000 ampere in delta connection, it has been found that substantially all of the ferrophosphorus can be tapped near the furnace bottom for tap intervals of about 1,000 megawatt hours, given that lime-containing oxidic phosphate ore with a $P_2O_5$ content of substantially 33% by weight and with a $Fe_2O_3$ content of substantially 1.3% by weight is used, and given further that the ferroalloy-receiving space has a volume of 12.5 cubic meters.

The intensity of the power supplied to the furnace can be increased, however, at the price of continuously decreasing quantities of recovered ferrophosphorus, which cannot be prevented from decreasing further, even by the provision in the furnace of more ferrophosphorus-receiving space.

TABLE I

| Secondary current intensity in amperes | Tap-intervals, megawatt hrs. | Ferrophosphorus-receiving space in cubic meters | Ferrophosphorus quantity, kg./ megawatt hrs. |
|---|---|---|---|
| 45,000 | 1,100 | 12.5 | 8.3 |
| 48,000 | 1,100 | 12.5 | 7.7 |
| 56,000 | 1,100 | 12.5 | 6.8 |
| 60,000 | 1,100 | 12.5 | 5.9 |
| 60,000 | 1,100 | 18.5 | 5.9 |

It has now unexpectedly been found that the ferroalloy yield can be increased even with variation of the power load by modification of the tap intervals rather than of the ferroalloy-receiving furnace space, i.e., by making the tap intervals a function of the power load.

TABLE II

| Secondary current intensity in amperes | Ferrophosphorus-receiving space in cubic meters | Tap-intervals, megawatt hrs. | Ferrophosphorus quantity, kg./ megawatt hrs. |
|---|---|---|---|
| 60,000 | 18.5 | 1,100 | 5.9 |
| 60,000 | 18.5 | 1,100 | 7.2 |
| 60,000 | 18.5 | 900 | 8.5 |

The present invention provides more especially a process for producing optimum yields of ferroalloys from slag-forming oxidic ores in electric reduction furnaces with variation of the power load therein, comprising modifying (a) the ferroalloy tap-intervals, which are expressed in megawatt power supplied per hour to the furnace and are determined by the $Fe_2O_3$ content of the reactants, the ferroalloy-receiving furnace space, and the secondary current intensity, and modifying (b) the secondary current intensity, (a) and (b) being modified in inverse relationship with respect to each other in such a manner that the tap intervals are shortened, given a current intensity increase, and prolonged, given a current intensity reduction. More especially, the tap intervals are shortened or prolonged at a rate between about 5 and 10% at a secondary current intenstiy increase or reduction of 10%.

The present process is preferably carried out using ores, for example, phosphate ore containing either free or bound calcium oxide. The surplus yield obtainable by the present process does not impair the quality of the ferrophosphorus produced, nor does it affect the yield of elementary phosphorus, given that the reactant mixture has a composition which substantially remains the same. A still further advantage associated with the present process is seen to reside in the formation of slag with a reduced content of ferrophosphorus. This means in other words that useful phosphorus products are obtained in an improved total yield, referred to the crude phosphate feed material.

The following examples read in context with Tables I and II hereinabove serve to further illustrate the process of the present invention.

EXAMPLE 1

Phosphate ore with a $Fe_2O_3$ content of 1.3% by weight was reduced. The resulting slag was found to contain 0.3% by weight $Fe_2O_3$. The electric furnace which had a capacity of 30 megawatt was operated at a current intensity of 45,000 ampere. The ferrophosphorus-receiving space at the furnace bottom occupied a volume of substantially 12.5 cubic meters.

The ferrophosphorus was tapped at intervals corresponding to 1,100 megawatt hours. 159 tons ferrophosphorus were produced supplying a total quantity of electrical power of 18,960 megawatt hours. This corresponded to the production of 8.4 kg. ferrophosphorus per megawatt hour.

EXAMPLE 2

Phosphate ore with a $Fe_2O_3$ content of 1.4% by weight was reduced. The resulting slag was found to contain 0.4% by weight $Fe_2O_3$. The electric furnace which had a capacity of 50 megawatt was operated at a current intensity of 60,000 ampere. The ferrophosphorus-receiving space at the furnace bottom occupied a volume of substantially 18.5 cubic meters.

The ferrophosphorus was tapped at intervals corresponding to 900 megawatt hours. A total of 264 tons ferrophosphorus was produced supplying a total quantity of electrical power of 30,983 megawatt hours. This corresponded to the production of 8.5 kg. ferrophosphorus per megawatt hour.

We claim:

1. A process for reducing slag forming oxidic ores having an $Fe_2O_3$ content in an electric arc reduction furnace having a substantially constant furnace space, a power load and a tap interval expressed in megawatt power hours comprising the steps of introducing a charge of said slag-forming oxidic ores in said furnace space, initially operating said furnace at a power load ranging approximately from 25 to 30 megawatts, initially tapping said furnace at a theoretically optimum ferroalloy tap interval of approximately 1,000 megawatt hours, initially operating said furnace at an initial current intensity ranging from approximately 45,000 to 60,000 amperes, said initial current intensity changing to a resultant current intensity as said furnace is being operated as a result of the variation in power load caused by the reduction reaction occurring within said furnace, the ferroalloy tap interval being shortened by 5 to 10% per a 10% increase of said resultant current intensity from said initial current intensity and being increased by 5 to 10% per a 10% decrease of said resultant current intensity from said initial current intensity.

2. A process as set forth in claim 1 wherein said slag-forming oxidic ores essentially consist of phosphate ores.

3. A process as set forth in claim 1 wherein said theoretically optimum ferroalloy tap interval is approximately 1,100 megawatt hours.

4. A process as set forth in claim 1 wherein said ferroalloy-receiving furnace space ranges approximately from 12.5 to 18.5 cubic meters.

References Cited

UNITED STATES PATENTS

| | | | |
|---|---|---|---|
| 3,204,176 | 8/1965 | Wilson | 323—43.5 |
| 3,427,530 | 2/1969 | Oakes | 323—43.5 |

ALLEN B. CURTIS, Primary Examiner

P. D. ROSENBERG, Assistant Examiner

U.S. Cl. X.R.

13—13; 75—24